United States Patent [19]
Peled et al.

[11] Patent Number: 4,883,726
[45] Date of Patent: Nov. 28, 1989

[54] MULTI-CELL BATTERY

[76] Inventors: Emanuel Peled, Hanotea Street, Even Yehuda, Israel, 40500; Mordechai Brand, 21 Kehilat Budapest Street 21, Tel Aviv, Israel, 69701; Esther Elster, 71 Hacarmel Street, Kfar Saba, Israel, 44231; Josef Kimel, 58 Brande Street, Petah-Tikva, Israel, 49600; Ronen Cohen, 55 Ein-Ganim Street, Petah-Tikva, Israel

[21] Appl. No.: 52,967

[22] Filed: May 22, 1987

[30] Foreign Application Priority Data
  May 23, 1986 [IL] Israel ........................................ 78893

[51] Int. Cl.⁴ ..................... H01M 10/50; H01M 6/42; H01M 2/08
[52] U.S. Cl. .................................. 424/120; 429/156; 429/184
[58] Field of Search ............... 429/120, 149, 156, 157, 429/183, 184

[56] References Cited

U.S. PATENT DOCUMENTS

| | | | |
|---|---|---|---|
| 1,199,390 | 9/1916 | Landau | 429/120 |
| 1,291,961 | 1/1919 | Morris | 429/156 |
| 1,501,084 | 7/1924 | Wright et al. | 429/156 |
| 3,784,411 | 1/1974 | Ciliberti | 424/157 |

Primary Examiner—Stephen J. Kalafut
Attorney, Agent, or Firm—Fleit, Jacobson, Cohn, Price, Holman & Stern

[57] ABSTRACT

The invention relates to a multi-cell battery of electrochemical cells of the type which is likely to be severely damaged and which is apt to release a substantial quantity of heat when short-circuited.

According to the invention, the multi-cell unit is provided with a certain filler in the space between the constituent electrochemical cells, which is either a solid with a melting point in a predetermined range of temperature, or a liquid. The filler ought to be electrically non-conducting, and its quantity ought to have an adequate heat capacity and it ought also to be capable to transfer heat to adjacent cells.

6 Claims, 1 Drawing Sheet

MULTI-CELL BATTERY

FIELD OF THE INVENTION

The invention relates to multi-cell batteries of the type likely to be severely damaged upon short-circuiting of one of the component cells, provided with means for dissipating heat generated upon short-circuiting, and for transferring such heat to the other cell or cells.

BACKGROUND OF THE INVENTION

One of the most severe safety problem encountered in high power multi-cell batteries is thermal runaway during accidental short-circuit of a single cell in the battery. In order to avoid such a case all high power lithium batteries (and also many other batteries) are equipped with a pressure release vent in addition to a fuse. However, the release to the surroundings of toxic and corrosive materials is thus not avoided. The major problem is that the heat capacity of a single cell is too small to avoid dangerous overheating.

SUMMARY OF THE INVENTION

A dangerous situation can be avoided if the excess heat released during accidental short-circuit of one cell can be transferred to a medium having an adequate heat capacity and/or to the neighboring cells.

According to the present invention a heat transfer material, designated as "cooling material" is inserted into the free space between the cells in the battery pack (FIG. 1). This heat absorption material (such as paraffin, wax, tar or the like) is solid up to a predetermined temperature (in the range of 40° C. to 150° C.). On accidental short-circuit of a cell in the multi-cell battery this material melts and transfers the released heat to all the cells in the battery. Thus the available heat capacity is markedly increased and thermal runaway conditions are avoided. The added material should be an electronic insulator both in the solid and in the molten (liquid) state.

When C or D size wound-type lithium or calcium thionyl chloride (or lithium $-SO_2$) cells is short-circuited its temperature reaches up to 200° C. within a few minutes (depending on the design of the cell). In the case of lithium cells, the anode melts leading to cell explosion. In the case of a calcium cell, the internal pressure rises to above 100 At. and the cell bulges leading to a break at the weakest point of the cell—most likely the glass-to-metal seal. FIG. 2 sets out the results of a short circuit test of medium power calcium-thionyl chloride C-size cell both in air and in a battery package equipped with heat transfer material according to the present invention.

It can be seen that in air, under short-circuit conditions, cell temperature rises to about 180° C. while in the battery case according to the present invention, the temperature reaches about 60° C. only. In this case the heat absorption material was paraffin with a melting point of 55°–60° C.

DESCRIPTION OF THE FIGURES

As shown in FIG. 1, A, B and C are C-size cells, D is a plastic housing, and E designates the cooling material in the space between the cells. In this Figure, "a" indicates a thermocouple inserted for measurement purposes in an experimental cell. The dimensions are indicated by way of illustration (in millimeters).

In FIG. 2, the test results in air are indicated by ○ and by ●; and in the battery package with the cooling medium by □ and by ■, the material used being paraffin with a melting point in the range of 55°–60° C.

Figure 1:
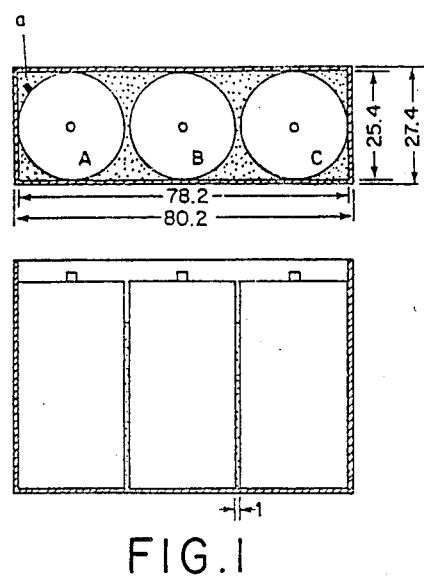
FIG. 1 illustrates a battery package according to the invention in sectional side-view and in a sectional top view.

The battery in FIG. 1 consisted of three C-size wound-calciumthionyl chloride cells having an electrode area of 130 $cm^2$ and 0.7M $Ca(AlCl_4)_2$. The temperature was measured on the can of the first cell in the row (point a FIG. 1). This cell has the worst cooling possibility.

Figure 2:
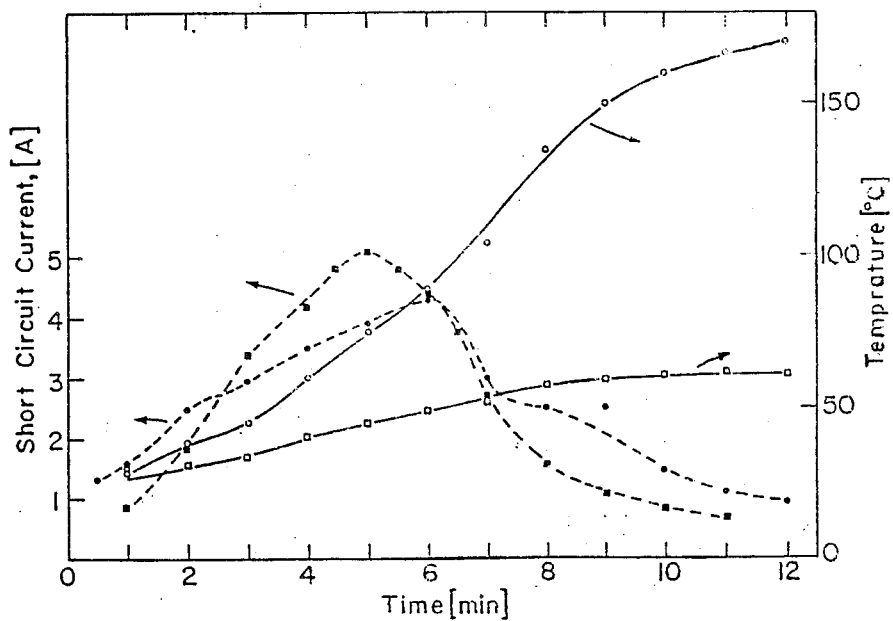
FIG. 2 is a graphical result of a short-circuit test.

This battery package contained 20 g of paraffin with a melting point of 55°–60° C. Cell A was short-circuited and its case temperature was measured versus time (FIG. 2). The maximum temperature during this test was 62° C. A similar test was conducted with cells having 1.2M $Ca(AlCl_4)_2$. In this test, when the cell was short-circuited in air the case temperature reached 230° C. in 7 minutes and it vented through the glass-to-metal seal. When this cell was short-circuited in a battery package according to this invention (FIG. 1), the maximum temperature was 80° C. during short circuit of cell A (FIG. 1), and the paraffin was melted in the whole battery. However, no cell vented or even leaked. This again proves the effectiveness of the cooling material according to our invention in preventing hazardous conditions during accidental short-circuit of a single cell in a battery.

Other cooling materials may be used and their melting point can be chosen according to the needs. It may be higher than the maximum operation temperature of the device equipped with the battery.

For example, a typical military temperature range is −40° to +70° C. Thus in this case, the melting point of the cooling material may be in the range of 80° to 100° C. It is desirable that the viscosity of the cooling material will be low. In addition, it is desired, but not necessary, that the specific heat capacity of this cooling material will be high. The use of cooling materials will not increase, in any significant way, the total weight of a closely packed battery.

According to FIG. 1 it can be calculated that the case of the cooling material, according to this invention, will increase the total weight of lithium or calcium batteries by 15 to 20%. A partial list of possible cooling materials to be used is given in Table 1.

TABLE 1

| Cooling Material | Melting Point (°C.) |
| --- | --- |
| Paraflint H-1 | 108 |
| Polymethylene | |
| Polywax 500 | 86 |
| Polyethylene | |
| Polywax 2000 | 125 |
| Polyethylene | |
| Beeswax | 64 |
| Candelilla Wax | 70 |
| Japan Wax | 53 |
| Paraffin | 46–68 |
| Petroleum Wax | 60–93 |
| Substituted Amide Waxes | 140 |

We claim:

1. A multi-cell electric battery comprising a housing, a plurality of electrochemical cells of cylindrical cross section positioned in the housing, said cells having a lithium or calcium anode, and an electrically insulating substance provided in the space between the cells, the electrically insulating substance being a solid having a melting point in the range between about 40° C. and about 150° C. and being capable of taking up heat and transferring heat from one cell to the others, in an unimpaired manner.

2. A cell according to claim 1, wherein the electrically insulating substance substantially fills the space between the cells.

3. A battery according to claim 1, wherein the electrically insulating substance has a high heat capacity and a low viscosity in the liquid state.

4. A multi-cell electric battery comprising a housing, a plurality of electrochemical cells of cylindrical cross section positioned in the housing, said cells having a lithium or calcium anode, and an electrically insulating substance provided in the space between the cells, the electrically insulating substance being a natural or synthetic wax, a paraffin, polyethylene, tar or a mixture of any of these.

5. A battery according to claim 1, wherein the cells are high-energy wound electrode cells.

6. A battery according to claim 1, wherein the cells have a a thionyl chloride, sulfuryl chloride, or sulfur dioxide electrolyte.

* * * * *